(12) United States Patent
Eugster et al.

(10) Patent No.: US 9,925,671 B2
(45) Date of Patent: Mar. 27, 2018

(54) ELECTROMECHANICAL TOOL HOLDER ASSEMBLY FOR MOBILE MANIPULATION APPARATUS

(71) Applicant: IMINA Technologies SA, Lausanne (CH)

(72) Inventors: Patrick Eugster, Clarens (CH); Fabien Tache, Lausanne (CH); Guillaume Boetsch, Ecasseys (CH); Benoit Dagon, Lausanne (CH)

(73) Assignee: IMINA Technologies SA (CH)

( * ) Notice: Subject to any disclaimer, the term of this patent is extended or adjusted under 35 U.S.C. 154(b) by 909 days.

(21) Appl. No.: 14/372,962

(22) PCT Filed: Jan. 16, 2013

(86) PCT No.: PCT/EP2013/050755
§ 371 (c)(1),
(2) Date: Jul. 17, 2014

(87) PCT Pub. No.: WO2013/113557
PCT Pub. Date: Aug. 8, 2013

(65) Prior Publication Data
US 2015/0015010 A1    Jan. 15, 2015

(30) Foreign Application Priority Data
Feb. 1, 2012 (CH) .................................. 0137/12

(51) Int. Cl.
*B25J 15/04* (2006.01)
(52) U.S. Cl.
CPC .................... *B25J 15/04* (2013.01)

(58) Field of Classification Search
CPC ................ B25J 15/04; Y10T 403/7045; Y10T 24/45152; Y10T 24/45173; Y10T 24/45255
See application file for complete search history.

(56) References Cited

U.S. PATENT DOCUMENTS 3,350,752 A * 11/1967 Plummer ................ B29C 65/56
24/584.1
3,413,752 A * 12/1968 Perry ...................... A63H 33/06
24/594.11
(Continued)

FOREIGN PATENT DOCUMENTS

FR         2639573 A1      6/1990

*Primary Examiner* — Jonathan P Masinick
(74) *Attorney, Agent, or Firm* — Blank Rome LLP

(57) ABSTRACT

A tool holder assembly, comprising, a first part (30) which is configured such that it is attachable to a mobile vehicle (50); and a second part (31) which is configured to cooperate with a tool (6); wherein the first and second parts (30,31) each comprises, a first flexible arm (8,10) and a second flexible arm (9,11) and one or more slots (14,15); wherein the first and second parts (30,31) are configured such that they can be arranged so that at least a portion (16,17,18,19) of the first and second flexible arms (8,9,10,11) of the each of the first and second parts (30,31) may be simultaneously received into the one or more slots (14,15) of the other part (30,31); and such that when the portion (16,17,18,19) of the first and second flexible arms (8,9,10,11) of the each of the first and second parts (30,31) are simultaneously received into the one or more slots (14,15) of the other part (30,31), the first and second flexible arms (8,9,10,11) of each part (30,31) are in a flexed position so that an elastic force of the flexible arms (8,9,10,11) hold the first and second parts (30,31) in cooperation.

14 Claims, 2 Drawing Sheets

(56) References Cited

U.S. PATENT DOCUMENTS

| | | | | |
|---|---|---|---|---|
| 5,640,744 | A | * | 6/1997 | Allan .................... A43B 11/00 24/306 |
| 5,774,955 | A | * | 7/1998 | Borchardt .......... B65D 33/2541 24/30.5 P |
| 5,791,810 | A | * | 8/1998 | Williams .............. E04B 1/6112 24/584.1 |
| 6,367,128 | B1 | * | 4/2002 | Galkiewicz ........ A44B 18/0053 24/572.1 |
| 8,011,849 | B2 | * | 9/2011 | Williams .............. E04F 19/022 403/169 |
| 8,079,186 | B2 | * | 12/2011 | Williams ................ E04B 9/005 52/220.6 |
| 8,776,376 | B2 | * | 7/2014 | Williams .............. E04F 19/022 29/450 |
| 2004/0001650 | A1 | * | 1/2004 | Piechocki .......... B65D 33/2516 383/59 |
| 2008/0182738 | A1 | | 7/2008 | Grunke et al. |
| 2010/0009825 | A1 | * | 1/2010 | Norton .................... B25J 15/04 483/58 |
| 2010/0059943 | A1 | * | 3/2010 | Norton .................. B23B 31/22 279/72 |
| 2010/0062919 | A1 | * | 3/2010 | Norton ................ B23B 31/103 483/55 |
| 2010/0113236 | A1 | * | 5/2010 | Norton .................... B23B 31/22 483/1 |

\* cited by examiner

ELECTROMECHANICAL TOOL HOLDER ASSEMBLY FOR MOBILE MANIPULATION APPARATUS

FIELD OF THE INVENTION

This application is a National Stage of International Application No. PCT/EP2013/050755, filed Jan. 16, 2013, which claims priority to Application No. CH 0137/12, filed Feb. 1, 2012. The content of those applications is hereby incorporated by reference.

The present invention relates to an electromechanical tool holder assembly for mobile manipulation apparatus, in particularly, but not exclusively, to an electromechanical tool holder assembly in which comprises a first part which is configured such that it is attachable to a mobile vehicle; and a second part which is configured to cooperate with a tool, wherein the first and second parts mechanically cooperate.

DESCRIPTION OF RELATED ART

Mobile manipulators are robotic systems comprising a robotic manipulator arm mounted on a mobile platform. Mobile manipulator combines the advantages of mobile platforms and robotic manipulator arms; for example, the mobile platform extends the workspace of the manipulator arm, whereas the manipulator arm offers several operational functionalities.

Mobile manipulators are typically remote controlled, and can be moved in any orientation e. linearly or rotationally; normally the movement resolution of a mobile manipulator is between one tenth of a nanometer to the centimeters range. Mobile manipulators can move on flat surface or along surfaces which have an inclination or declination.

The manipulator arm has a tool which is suitable to execute a particular task. Depending on the application for which the mobile manipulator is used, a dedicated tool is mounted on the end of the manipulator arm. The tool can take many different forms, such as an electrical probing tip, an optical fiber, a gripper, a force sensor, a temperature sensor, etc. Each mobile manipulator will therefore have a specific functionality defined by the tool which is attached to its manipulator arm. Of course the operation of the tool may also be controlled remotely.

The tools are usually attached to the manipulator arms using screws. Since the manipulator arms and tools typically have small dimensions the screws used to attach the tools are often very small. Thus, high dexterity is required to attach a tool. Moreover it is time consuming to attach a tool using a screw, and even more time consuming when an attached tool is to be replaced with another tool. Accordingly in existing mobile manipulators tools may not be easily attached or replaced.

US2008182738 discloses a two-piece tool changing device is described. The changing device includes a base and a plate that nests with the base. The base includes a body along with guide brackets and a manifold attached to, or defined within, the base at a point along the peripheral edge of the base. The plate includes shoulders that reversible engage with the guide brackets. A standing section extends from the manifold toward the guide brackets, and defines a channel between the standing section and the body. A spring-biased plunger is optionally disposed within an aperture in the standing section, and the spring plunger is movable between a first position extending into the channel and a second position withdrawn from the channel. At least one conduit is optionally defined in the manifold and a corresponding conduit is defined in the plate, such that the conduit in the manifold and the conduit in the plate are in registration when the plate is nested in the base.

It is an aim of the present invention to mitigate or obviate at least some of the above-mentioned disadvantages.

BRIEF SUMMARY OF THE INVENTION

According to the invention, these aims are achieved by means of a tool holder assembly, comprising, a first part which is configured such that it is attachable to a mobile vehicle; and a second part which is configured to cooperate with a tool;

wherein the first and second parts each comprise, a first flexible arm and a second flexible arm and one or more slots;

wherein the first and second parts are configured such that they can be arranged so that at least a portion of each the first and second flexible arms, of each of the first and second parts, may be simultaneously received into the one or more slots of the other part, to hold the first and second parts in cooperation.

The first and second parts may be configured such that when the portions of the first and second flexible arms, of the each of the first and second parts, are simultaneously received into the one or more slots of the other part, the first and second flexible arms of each part may be in a flexed position, so that the first and second flexible arms of the first part may apply an elastic force to the second part and the first and second flexible arms of the second part may apply an elastic force to the first part.

Preferably the tool is fixed to the second part. The tool may be irremovably fixed to the second part. The tool may be integral to the second part. Preferably the tool is fixed to the second part during the manufacture of the second part.

Preferably the first part which is attached to a mobile vehicle.

The insertion of the portions of the first and second flexible arms into the slots, and the elastic force, hold the first and second parts in mechanical cooperation.

The tool holder assembly of the present invention allows a user easily mount or replace tools on a mobile vehicle (e.g. to mount or replace tools on a mobile platform of a mobile manipulator). A tool may be pre-attached to the second part of the tool assembly; typically a user will comprise a plurality of second parts each having a different tool attached thereto. Also the first part may be pre-attached to the mobile vehicle (such as mobile platform of a mobile manipulator). Depending on the application, a user will select a tool to be mounted on the mobile vehicle. To mount the tool the user is required to simply arrange the second part, to which the tool is attached, so that the portions of the first and second flexible arms of the second part are received into the slots on the first part and such that the portions of the first and second flexible arms of the first part are received into the slots on the second part. The elastic force of the flexible arms will hold the first and second parts in cooperation. To replace the tool the user is required simply to remove the portions of the first and second flexible arms from their respective slots; and then apply another second part, which has the desired tool attached thereto, to the first part which is attached to the mobile vehicle. The present invention enables a user quickly, and easily replace and mount tools on a mobile manipulator and obviates the need for fixed attachments in which tools cannot be replaced or screw attachments which require high dexterity.

The elastic force of the flexible arms holds the first and second parts in mechanical cooperation.

The tool holder assembly is preferably configured such that it is attachable to a mobile vehicle. For example, the tool holder assembly may comprise a connecting means for connecting the tool holder assembly to a mobile vehicle. For example the first part may comprise a connecting means which is suitable for connecting to a second connecting means provided on the mobile vehicle.

The first and second flexible arms of each of the first and second parts are configured to have an elasticity which ensures that, in the flexed position, they provide an elastic force sufficient to hold the first and second parts in cooperation.

The dimensions of said slots may be smaller than the dimensions of said projections on the first and second flexible arms, so that only a part of each projection is received into each slot, so that the first and second flexible arms are flexed when projections on the first and second flexible arms of each part are received into slot on the other part, so that the first and second flexible arms or the first part apply an elastic force to the second part and the first and second flexible arms of the second part apply an elastic force to the first part. Preferably, the opening of the slots is smaller than the cross sectional area of the projections.

The dimensions of the slots and/or the dimensions of the portions of the first and second flexible arms which are simultaneously received into the one or more slots of the other part; and the elasticity of the first and second flexible arms; are such that the elastic force of the flexible arms is sufficient to hold the first and second parts in cooperation.

The slots may be configured such that the opening of each slot may have the dimensions in the range from 0.15 mm×0.3 mm×0.3 mm up to 2.5 mm×5 mm×5 mm. The dimensions of the slots are preferably 0.5 mm×1 mm×1 mm.

The dimensions of the first and second flexible arms of each for the first and second parts may be in the range from 1.5 mm×0.1 mm×0.3 mm up to 25 mm×2 mm×5 mm. Preferably the dimensions of the first and second flexible arms of each part are 5.1 mm×0.4 mm×1 mm.

The spring constant of the first and second arms of each of the first and second part is between 0.5 and 10 N/mm$^2$.

Each of the first and second parts may further comprise a stopper.

The stopper on each of the first and second parts may be configured to restrict the relative movement between first and second parts as the first part and second parts are being arranged so that at least a portion of the first and second flexible arms of the each of the first and second parts are simultaneously received into the one or more slots of the other part.

The stopper on each of the first and second parts may comprise an extension which is interposed between the first and second flexible arms.

Each stopper may be configured such that the stopper on the first part abuts the stopper on the second part, when the first and second parts are arranged such that the portion of the first and second flexible arms of the each of the first and second parts is simultaneously received into the one or more slots of the other part. For example, extensions which define each stopper may have dimensions (e.g. a length) such that the extension on the first part abuts the extension on the second part, when the first and second parts are arranged such that the portion of the first and second flexible arms of the each of the first and second parts is simultaneously received into the one or more slots of the other part.

The first flexible arm and a second flexible arm of each of the first and second parts may each define a receiving region which can receive the stopper of the other part.

The first part may be arranged such that it is fixed to a mobile vehicle. Preferably, the first part may be arranged such that it is removably attached to a mobile vehicle. For example the first part may comprise a connecting means. The connecting means may be which is suitable for connecting to, or preferably releasably connecting to, a second connecting means provided on mobile vehicle.

The second part may further comprise a tool. The tool may be removably attached to the second part. The tool may be fixed to the second part.

The second part may be configured such that it can cooperate with the tool such that the tool can be attached, preferably removably attached, to the second part. For example the second part may comprise a connecting means. The connecting means may be suitable for connecting to, or preferably releasably connecting to, a second connecting means provided on a tool.

The tool may comprise at least one of, a force sensor, thermal/heat sensor, electrical probing tip, atomic force microscopy probe tip, micro/nano gripper, micro/nano tweezers, optical fiber, pipette, antenna, electrodes, micro-valve, liquid/gas injector, liquid dispenser, scanning tunnelling microscope tips, suction cup, cleaning system, scratching system, soldering system, screwdriver, scanner device, actuator, actuated subsystem with at least one degree of freedom, and/or sensor suitable for measuring physical parameters.

The tool holder assembly further comprises an electrical interface which can electrically connect the tool holder assembly to a mobile Vehicle. The electrical interface may comprise a cable mounted on the second part.

The first part may comprise a first electrical connection and the second part may comprise a second electrical connection. The first part and second part may be arranged such that the first and second electrical connections electrically connect. The first and second electrical connections may be arranged on the first and second parts respectively, such that when the first and second parts are arranged such that when first and second parts are arranged such that the portion of the first and second flexible arms, of the each of the first and second parts, are simultaneously received into the one or more slots of the other part, then the first and second electrical connections will electrically connect. The first part may further comprise a third electrical connection for electrically connecting the first part to a mobile vehicle. The electrical interface and/or the electrical connections may enable a tool to be remotely controlled.

Each of the first flexible arm and a second flexible arm in each of the first and second parts, may comprise a projection. The projections may define the portion of each the first and second flexible arms, of each of the first and second parts, which is simultaneously received into the one or more slots of the other part.

The projections are configured such that at least a portion of the projection may be received into a slot on the other part.

The portions of the first and second flexible arms which are simultaneously received into the one or more slots of the other part, each comprise a curved surface. For example, the first flexible arm and a second flexible arm in each of the first and second parts, may comprise a projection at least a part of which are received in to the one or more slots of the other part; these projections may comprise a curved surface.

The one or more slots may be defined by one or more blind holes.

The one or more slots may be defined by a through-hole.

The first part and second part each comprise conductive material. Advantageously if the first and second parts comprises conductive material, this prevents electric charges from building up on the first and second parts, when in use.

The first part and second part may each comprise non-magnetic material.

The first part and second part may each comprise plastic.

According to a further aspect of the present invention there is provided a mobile vehicle comprising a tool holder assembly according to of the above-mentioned tool holder assemblies. The mobile vehicle with tool holder assembly may define a mobile manipulator.

According to a further aspect of the present invention there is provided a mobile manipulator comprising, a mobile vehicle, and a tool holder assembly according to any one of the above-mentioned tool holder assemblies.

The mobile vehicle may further comprise at least one piezoelectric actuator operable to move the mobile vehicle.

The tool holder assembly is preferably connected to the mobile vehicle via a connecting means provided on the first part of the tool holder assembly. The mobile vehicle preferably comprises a connecting means which is suitable for cooperating with a connecting means provided on the first part of the tool holder assembly.

The mobile vehicle may further comprise a connecting means which connects to the first part of the tool holder assembly so that the tool holder assembly is attached to the mobile vehicle. The connecting means may be configured such that it removable connects to a second part of the tool holder assembly so that the tool holder assembly is removably attached to the mobile vehicle.

The at least one piezoelectric actuator is configured such that it is operable to move the mobile vehicle with a resolution down to the tenth of a nanometer and with displacements in the centimeter range.

The mobile vehicle is preferably configured to have, a height which is at most 25 mm, a width which is at most 25 mm and a length which is at most 25 mm.

The mobile vehicle may further comprise an electrical connector. The mobile vehicle may further comprise a controller which is operable to control the operation of the tool holder assembly. The mobile vehicle may further comprise an electrical connection which can electrically connect to the tool holder assembly such that a controller in the mobile vehicle can control the operation of the tool holder assembly.

The mobile vehicle may be a mobile micro-manipulator.

According to a further aspect of the present invention there is provided a tool assembly, comprising, a tool holder assembly according to any one of the above-mentioned tool holder assemblies, and a tool which is arranged in cooperation with the second part of the tool holder assembly.

The tool may comprise at least one of, a force sensor, thermal/heat sensor, electrical probing tip, atomic force microscopy probe tip, micro/nano gripper, micro/nano tweezers, optical fiber, pipette, antenna, electrodes, micro-valve, liquid/gas injector, liquid dispenser, scanning tunnelling microscope tips, suction cup, cleaning system, scratching system, soldering system, screwdriver, scanner device, actuator, actuated subsystem with at least one degree of freedom, and/or a sensor suitable for measuring physical parameters.

According to a further aspect of the present invention there is provided; a scanning electron microscope system; a transmission electron microscope system; a focused ion beam system; a dual beam microscope system; a scanning tunnelling microscope; a vacuum chamber; an ultra-high vacuum chamber; an environmental chamber; and/or in an optical or light microscope system; comprising a tool holder assembly according to any one of the above-mentioned tool holder assemblies.

According to a further aspect of the present invention there is provided, the use of a tool holder assembly according to any one of the above-mentioned tool holder assemblies, in any one of; a scanning electron microscope system; a transmission electron microscope system; a focused ion beam system; a dual beam microscope system; a scanning tunnelling microscope; a vacuum chamber; an ultra-high vacuum chamber; an environmental chamber; and/or in an optical or light microscope system.

According to a further aspect of the present invention there is provided a tool holder assembly kit comprising, a first part of a tool holder assembly which is configured such that it is attachable to a mobile vehicle; and two or more second parts of the tool holder assembly, each of the two or more second parts comprising a different tool attached thereto; wherein the first part and two or more second parts each comprise, a first flexible arm and a second flexible arm and a slot; wherein the first and second parts are configured such that a first part and any one of the second parts can be arranged so that at least a portion of each of the first and second flexible arms of each of the first and second parts, may be simultaneously received into the slots of the other part, to hold the first and second parts in cooperation.

The portions of the first and second flexible arms of each of the first and second parts may be projections provided on the first and second flexible arms of each part.

The dimensions of the slots may be smaller than the dimensions of the projections, so that only a part of each projection can be received into each slot, so that the first and second flexible arms are flexed when the projections on the first and second flexible arms of each part are received into the slot on the other part. Preferably, the opening of the slots is smaller than the cross sectional area of the projections.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
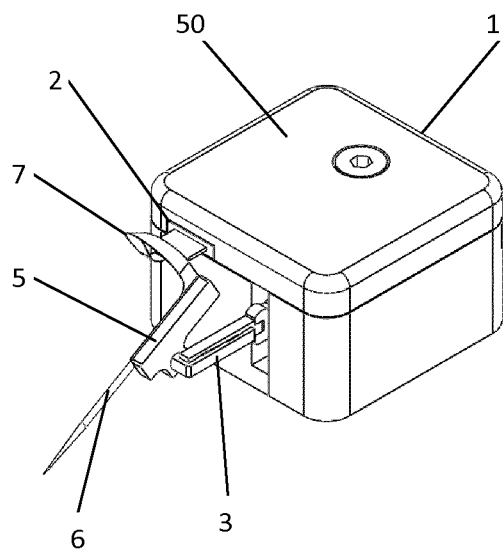
FIG. 1 is a perspective view of a mobile manipulator according to an embodiment of the present invention which comprises a mobile vehicle and a tool holder assembly according to an embodiment of the present invention.

FIG. 1 is a perspective view of a mobile manipulator 1 according to an embodiment of the present invention. The mobile manipulator 1 comprises a mobile vehicle 50. The mobile manipulator 1 comprises a tool holder assembly 3 according to an embodiment of the present invention which is attached to the mobile vehicle 50.

A tool 6 is connected to the tool holder assembly 3. The tool 6 comprises a support 5 which is used to connect the tool 6 to the tool holder assembly 3. In this example, the support 5 is integral to the tool 6 and the support 5 is in electrical connection with the tool 6. Alternatively the support may be glued or secured to the tool 6 using any other suitable fastening means e.g. screwed, clipped, welded, soldered, inserted, clamped on said support 5. The support 5 is a mechanical interface which enables the tool 6 to be easily mechanically connected to the tool holder assembly 3. It should be noted that, alternatively the tool 6 could be directly connected to the tool holder assembly 3 and that the support 5 is not an essential feature of the invention; in the preferable embodiment of the invention the tool 6 will be connected directly to the tool holder assembly 3 by means of glue, screws, or any another other suitable fastening means.

It should also be understood that the tool 6 could be arranged into various different orientations on the tool holder assembly 3.

The tool 6 in this example is in the form of is an electrical probing tip 6; however it will be understood that the tool may take any other suitable form; for example the tool 6 may be, any of a force sensor, thermal/heat sensor, electrical probing tip, atomic force microscopy probe tip, micro/nano gripper, micro/nano tweezers, optical fiber, pipette, antenna, electrodes, micro-valve, liquid/gas injector, liquid dispenser, scanning tunnelling microscope tips, suction cup, cleaning system, scratching system, soldering system, screwdriver, scanner device, actuator, actuated subsystem with at least one degree of freedom, and/or sensor suitable for measuring physical parameters.

The mobile manipulator 1 further comprises an electrical connector 2 which is integral to the mobile vehicle 50. To establish electrical connection between the electrical probing tip 6 and the mobile vehicle 50, a flexible cable 7, which is electrically connected to the support 5 (which is electrically connected to the electrical probing tip 6 (tool 6)), may be plugged into the electrical connector 2 on the mobile vehicle 50. It should be understood that for certain applications, electrical connection between the electrical probing tip 6 (tool 6) and the mobile vehicle 50 will not always be necessary. The flexible cable 7 is glued to said support 5, but it could alternatively be screwed, clipped, welded, soldered, inserted, clamped on said support 5. It will also be understood, that in embodiments which do not comprise a support 5, the flexible cable 7, may be electrically connected directly to the electrical probing tip 6 (tool 6), and plugged into the electrical connector 2 on the mobile vehicle 50.

Figure 2:
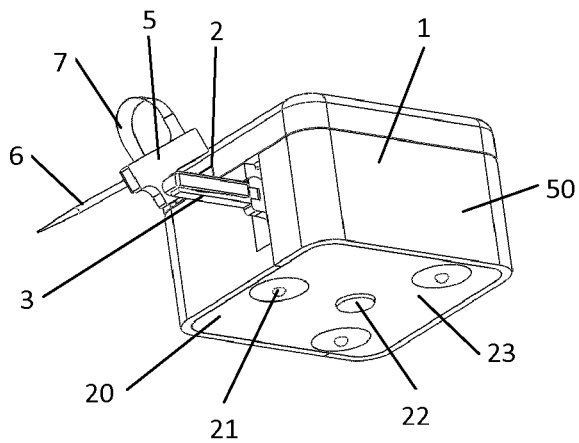
FIG. 2 is a perspective view of the mobile vehicle of FIG. 1, showing an under-surface of the mobile vehicle.

FIG. 2 is a perspective view of the mobile manipulator 1 of FIG. 1 in which an under-surface 20 of the mobile manipulator 1 is shown. Said mobile manipulator 1 comprises a piezoelectric actuator 23 which are operable to manoeuvre the mobile manipulator 1. The piezoelectric actuator 23 comprises a piezoelectric ceramic plate 20 and a plurality of ruby contacts 21, which are fixed to said piezoelectric ceramic plate 20. The piezoelectric actuator 23 can operate to manoeuvre the mobile manipulator 1 using a stick and slip principle: a stick and slip principle comprises a first, stick, phase and a second, slip, phase; during the first, stick, phase, the piezoelectric ceramic plate 20 is compressed by applying an electrical field across the ceramic plate 20. As the piezoelectric ceramic plate 20 is compressing, the ruby contacts 21 grip the surface on which the mobile manipulator 1 rests, so that mobile manipulator 1 is dragged forward. During the second, split, phase, the electrical field is removed from the piezoelectric ceramic plate 20 or the direction of the electric field is reversed; the piezoelectric ceramic plate 20 returns quickly from its compressed state to its uncompressed state; due to high inertia of said mobile manipulator 1, the ruby contacts 21 will slide over the surface on which the mobile manipulator 1 rests without moving the mobile manipulator 1. Now in its uncompressed state the piezoelectric ceramic plate 20 first, stick, phase may be repeated. The stick and slip phases are repeated to move the mobile manipulator 1 further forward. The piezoelectric actuator 23 can move the mobile manipulator 1 in any orientation, including linearly or rotationally. The piezoelectric actuator 23 enables movement resolution one tenth of a nanometer and displacements up to several centimeters, to be achieved.

The mobile manipulator 1 further comprises a magnet 22. If the surface on which the mobile manipulator 1 rests is a ferromagnetic surface, then the magnet 22 may be used to secure the mobile manipulator 1 to the surface. The magnetic force between the magnet 22 and surface, will pull the mobile manipulator 1 towards the surface thus increasing the frictional forces which exist between the ruby contacts 21 and the surface.

Figure 3:
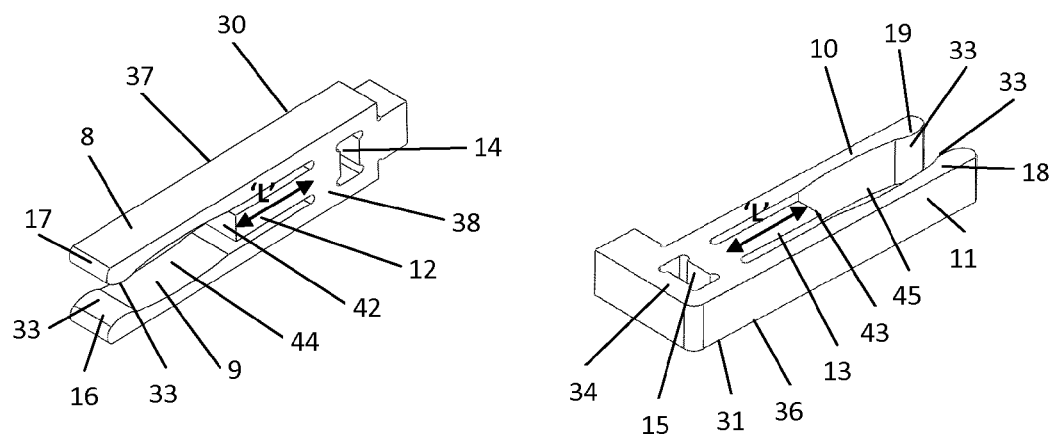
FIG. 3 is a perspective view of the first and second parts which define the tool holder assembly used in mobile manipulator shown in FIG. 1.
Figure 4:
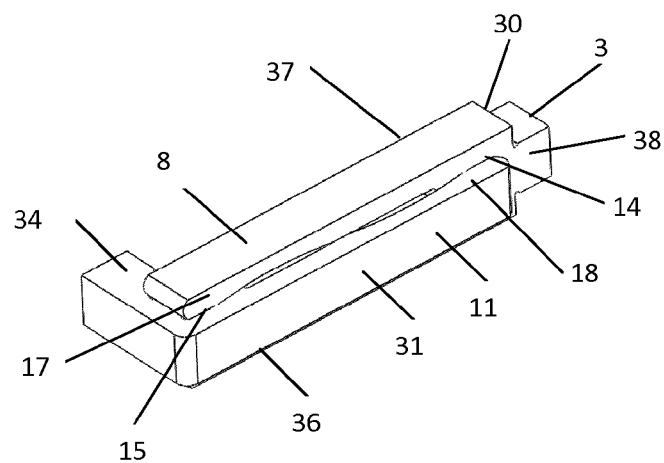
FIG. 4 provides a perspective view of the first and second parts of the tool holder assembly, arranged in cooperation.

FIG. 3 is a perspective view of the first and second parts which define the tool holder assembly 3. FIG. 4 shows a perspective view of the first and second parts of the tool holder assembly shown in FIG. 3, when assembled.

Referring to FIGS. 3 and 4, the tool holder assembly 3 comprises, a first part 30 which is configured such that it is attachable to a mobile vehicle; and a second part 31. As shown in FIG. 1 a tool 6 may be connected to the second part 31 by means of a support 5 for example. It should be understood that the tool 6 and support 5 are not essential features of the tool holder assembly 3. The first part 30 and second part 31 each comprise conductive material, non-magnetic material and/or plastic.

The first and second parts 30,31 each comprise, a first flexible arm 8,10 and a second flexible arm 9,11.

Each of the first and second flexible arms 8,9,10,11 in each of the first and second parts 30,31, comprise a projection 16, 17, 18, 19. Each projection comprises a curved surface 33.

The first and second parts 30,31 each comprise a slot 14,15 which is defined by a through-hole in each of the respective first and second parts 30,31 so that each slot 14,15 is accessible from opposite sides of each part.

The projections 16,17 on the first and second flexible arms 8,9 on the first part 30 are dimensioned such that at least a portion of each projection 16,17 may be received into the slot 15 on the second part 31. The projections 18, 19 on the first and second flexible arms 10,11 on the second part 31 are dimensioned such that at least a portion of each projection 18,19 may be received into the slot 14 on the first part 30. The curved surfaces 33 on the projections 16,17,18,19 will facilitate the projections 16,17,18,19 in being received into their respective slots 14,15.

The dimensions of the first and second parts 30,31 are such that they can be arranged so that the projections 16,17,18,19 on each of the first and second flexible arms 8,9,10,11 of each of the first and second parts 30,31, may be simultaneously received into the slot 14,15 of the other part 30,31. As shown in FIG. 4 the projections 16,17 on the first and second flexible arms 8,9 of the first part 30 are received into the slot 15 in the second part 31. As the slot 15 on the second part 31 is defined by a through-hole the projection 17 on the first flexible arm 8 is inserted into a slot 15 opening located on a first side 34 of the second part 31, and the projection 16 on the second flexible arm 9 is inserted into a slot 15 opening located on a second side 36 of the second part 31. Likewise, the projections 18,19 on the first and second flexible arms 10,11 of the second part 31 are received into the slot 14 in the first part 30. As the slot 14 on the first part is defined by a through-hole the projection 19 on the first flexible arm 10 is inserted into a slot 14 opening located on a first side 37 of the first part 30, and the projection 18 on the second flexible arm 11 is inserted into a slot 14 opening located on the a second side 38 of the first part 30. Accordingly, as shown in FIG. 4 the projections 16,17,18,19 on each of the first and second flexible arms 8,9,10,11, of each of the first and second parts 30,31, are simultaneously received into the slot 14,15 of the other part 30,31.

The dimensions of the slots 14,15 and projections 16,17, 18,19 are such that when the first and second parts 30,31 are arranged to cooperate such that all the projections 16,17,18, 19 are received into their respective slots 14,15, each of the first and second flexible arms 8,9,10,11, of each of the first and second parts 30,31, will be flexed. The elastic force of the flexible arms 8,9,10,11 will maintain the projections 16,17,18,19 inserted in their respective slots 14,15; as a result the first and second parts are maintained in mechanical cooperation. Additionally, the elastic force of the flexible arms 8,9,10,11 will ensure that the flexible arms 8,9 of the first part 30, will grip the second part 31, and that the flexible arms 10,11 of the second part, will grip the first part 30. Preferably, the dimensions of the opening of each slot 14,15, the dimensions of the projections 16,17,18,19 on the first and second flexible arms 8,9,10,11 of each part 30,31, and the elasticity of the first and second flexible arms 8,9,10,11, are such that the first and second parts 30,31 are held in rigid mechanical cooperation so that the first and second parts 30,31 are prevented from moving with respect to one another.

In this particular example, the opening of each slot 14,15 each have the dimensions 0.5 mm×1 mm×1 mm; the dimensions of the first and second flexible arms 8,9,10,11 of each part 30,31 are 5.1 mm×0.4 mm×1 mm; and the spring constant of the first and second flexible arms 8,9,10,11 of each of the first and second parts 30,31 is between 0.5 and 10 N/mm².

As shown in FIG. 3 each of the first and second parts 30,31 further comprise a stopper 12, 13 in the form of an extension 12,13 which is interposed between the first and second flexible arms 8,9,10,11. The extension 12,13 on each of the first and second parts 30,31 are configured to restrict the relative movement between first and second parts 30,31 as the first part and second parts are being arranged to mechanically cooperate (as shown in FIG. 4).

Each extension has a length 'L' which ensures that when the first and second parts 30,31 are being arranged such that the projections 16,17,18,19 on each of the first and second flexible arms 8,9,10,11 of the each of the first and second parts 30,31 are simultaneously received into the slot 14,15 of the other part 30,31, an end 42 of the extension 12 on the first part 30 will abut an end 43 of the extension 13 on the second part 31. As the extensions 12,13 abut they will prevent the first and second parts 30,31 from moving so that the projections 16,17,18,19 are moved beyond the slots 14,15 on the other part 30,31.

As can be seen from FIG. 3 the first and second flexible arms 8,9,10,11 of each of the first and second parts 30,31 define a receiving region 44,45 which can receive the extension 12,13 provided on the other part 30,31. Accordingly, when the first and second parts 30,31 are arranged in mechanical cooperation, as shown in FIG. 4, the extension 12 provided on the first part 30 is received into the receiving region 45 in the second part 31 and the extension 13 provided on the second part 31 is received into the receiving region 44 in the first part 30.

Optionally the first part 30 may further comprise a connecting means (not shown) which is suitable for connecting to a second connecting means (not shown) provided on the mobile vehicle; the connecting means will facilitate easy connection of the first part 30 to the mobile vehicle 50. However, in the example shown in FIG. 1 the first part 30 of the tool holder assembly 3 is glued to the mobile vehicle 50. It will be understood that the first part 30 of the tool holder assembly may alternatively be fixed to the mobile vehicle 50 using screws, clips, welding, soldering.

Optionally, the second part 31 may further comprise a connecting means which is suitable for releasably connecting to a tool 6. Preferably, a tool 6 will be fixed to the second part 31, or integral to the second part 31. Most preferably, the tool 6 will fixed to the second part 31 during manufacturing process, so that a user is not required to handle the tool 6 independently of the second part 31.

The tool holder assembly 3 of the present invention allows a user easily mount or replace tools 6 on a mobile vehicle 50 (e.g. to mount or replace tools on a mobile platform of a mobile manipulator). A tool 6 may be pre-attached to the second part 31 of the tool assembly 3 during the manufacturing stage; typically a user will comprise a plurality of second parts 31 each having a different tool 6 attached thereto. Also the first part 30 may be pre-attached to the mobile vehicle 50. Depending on the application, a user will select a suitable tool 6 to be mounted on the mobile vehicle 50; thus providing a mobile manipulator 1 which is suitable for the application. To mount the tool 6 the user is required to simply arrange the second part 31, to which the tool 6 is attached, so that the projections 19,18 of the first and second flexible arms 10,11 of the second part 31 are received into the slot 14 on the first part 30 and such that the projections 16, 17 of the first and second flexible arms 8,9 of the first part 30 are received into the slot 15 on the second part 31. Then, the projections 16,17,18,19 which are inserted into the slots 14,15, the elastic force of the flexible arms 8,9,10,11 and the extensions 12,13 will ensure that the first and second parts 30,31 are prevented from moving with respect to one another; accordingly the first and second parts 30,31 will be rigidly connected. A user can thus easily configure a mobile manipulator 1 so that it is suitable for a particular application.

To replace the tool 6 the user is required simply to remove the projections 16,17,18,19 of the first and second flexible arms 8,9,10,11 from their respective slots 14,15 so that the second part 31 is no longer held in mechanical cooperation with the first part 30; the second part 31 and tool 6 (which is attached to the second part 31) can thus be removed from the mobile manipulator 1. Once the second part 31 has been removed, the user may then apply another second part 31, which has the desired tool 6 pre-attached thereto, to the first part 30, which is attached to the mobile vehicle 50. By replacing the second part 31 with another second part 31 which has a different tool 6 pre-attached thereto, a user may easily reconfigure the mobile manipulator 1 so that it is suitable for a different application.

Thus, advantageously, the present invention enables a user quickly, and easily replace and mount tools 6 on a mobile manipulator 1 and obviates the need for either fixed attachments in which tools 6 cannot be replaced, or screw attachments which require high dexterity. Furthermore, since the tool 6 is preferably fixed, or pre-attached to the second part 31 during the manufacturing process, a user is not required to handle a small dimensioned tool 6 alone; the user is required to handle the second part 31 to which the tool 6 is fixed, or pre-attached. Since the second part 31 with the tool 6 attached will have larger dimensions than the tool 6 alone, this makes for easier handling, application, and replacement of tools 6 on the mobile manipulator 1. Preferably the first part 30 and second part 31 of the tool assembly 3 will have dimensions in the range from 2.5 mm×0.5 mm×0.3 mm up to 40 mm×10 mm×5 mm (length× width×height), and preferably will have dimensions 8 mm×2 mm×1 mm (length×width×height).

During use the first part 30 of the tool handling assembly 3 is pre-attached, or fixed, to an movable actuator or fixed part of the mobile vehicle 50. The first part 30 may be attached using glue or any other suitable securing means such as screws, clamps, welding, or soldering. A plurality of second parts 31 are provided, each having a different tool 6 pre-attached thereto. A user selects a second part 31 which has a desired tool attached thereto.

The user then moves the second part 31 so that the extension 13 on the second part 31 is received into the receiving region 44 of the first part 30 and so that so that the extension 12 on the first part 30 is received into the receiving region 45 of the second part 31. The user continues to move the second part 31, relative to the first part 30, until the projections 18,19 on the first and second flexible arms 10,11 of the second part 31 are received into the slot 14 provided on the first part 30 and the projections 16,17 on the first and second flexible arms 8,9 of the first part 30 are received into the slot 15 provided on the second part 31. In any case, at this stage the extension 12 on the first part 30 and the extension 13 on the second part 31 will abut one another to prevent further movement of the second part 31, relative to the first part 30. The projections 18,19 on the first and second flexible arms 10,11 of the second part 31 will clip into the slot 14 on the first part 30 and the projections 16,17 on the first and second flexible arms 8,9 of the first part 30 will clip into the slot 15 on the second part 31. The curved surface 33 of the projections 16,17,18,19 will facilitate the insertion of the projections 16,17,18,19 into their respective slots 14,15. When the respective projections 16,17,18,19 are received into their respective slots 14,15, the first and second flexible arms 8,9,10,11 of each part 30,31 will be in a flexed position and the elastic force of the first and second flexible arms 8,9,10,11 will maintain the projections inserted in their respective slots. The elastic force of the first and second flexible arms 8,9,10,11 of each of the first and second parts 30,31 will also ensure that the first and second parts 30,31 frictionally grip one another. Thus, the projections 16,17, 18,19, slots 14,15, elastic force of the flexible arms 8,9,10, 11, and the extensions 12,13, will prevent the first and second parts 30,31 from moving with respect to each other; and the first and second parts will be maintained in rigid mechanical cooperation.

For each of the first and second parts 30,31, the dimension of the opening of each slot 14,15, the location of the slots (specifically, its location relative to said extension 12,13) as well as the distance between the projections 16,17,18,19 on the first and second flexible arms 8,9,10,11, may be such that the projections 16,17,18,19 on each flexible arm 8,9,10,11 are not fully received into their respective slots 14,15 when the first and second parts are arranged in mechanical cooperation; this will result in an increase in the amount that the first and second flexible arms 8,9,10,11 of each part 30,31 are flexed and thus will increase the elastic force which is applied by the flexed first and second flexible arms 8,9,10, 11. This will further increase the amount which the flexible arms 8,9,10,11 of one part 30,31 frictionally grip the other part 30,31.

If an electrical connection between the mobile vehicle 50 and the tool 6 attached to the second part is required, then an electrical cable may be used to connect the tool handling assembly 3 to the electrical connector 2 on the mobile vehicle 50.

The shape of the first and second parts allows simple and low cost manufacturing; both the first and second parts of the attachment system can be easily cut out from a plate using, for example, a laser cutter.

The force required to arrange the first and second parts 30,31 in mechanical cooperation and the elastic force of the flexed flexible arms 8,9,10,11 may depend on the thickness, height and length of the first and second flexible arms 8,9,10,11. The dimensions of the first and second flexible arms 8,9,10,11 of each part 30,31 may range from 1.5 mm×0.1 mm×0.3 mm up to 25 mm×2 mm×5 mm (length× thickness×height). Preferably the dimensions of the first and second flexible arms 8,9,10,11 of each part 30,31 will be 5.1 mm×0.4 mm×1 mm (length×thickness×height). Preferably, the first and second parts 30,31 will be configured such that the force required to arrange the first and second parts 30,31 in mechanical cooperation is preferably within the range of 0.1 N up to 5 N. Preferably, the first and second parts 30,31 will be configured such that the force required to arrange the first and second parts 30,31 in mechanical cooperation is 2 N. This reduces the possibility of damage being caused to a tool 6 attached to the second part 31, or to either of the first and second parts 30,31. The force required to arrange the first and second parts 30,31 in mechanical cooperation is dictated by the dimensions of the first and second parts 30,31, the dimensions of the first and second flexible arms 8,9,10,11 of each part 30,31, and the elasticity of the first and second flexible arms 8,9,10,11.

Various modifications and variations to the described embodiments of the invention will be apparent to those skilled in the art without departing from the scope of the invention as defined in the appended claims. For example the flexible cable 7 could alternatively be rigid if said first part 30 of the tool holder assembly 3 is rigidly attached to said mobile vehicle 50, or flexible if said first part 30 of the tool holder assembly 3 is actuated and mobile. The rigid or flexible cable 7 may comprise one or a plurality of electrical conductors, so that the flexible cable could be used to transmit one or several electrical signals.

Although the invention has been described in connection with specific preferred embodiments, it should be understood that the invention as claimed should not be unduly limited to such specific embodiment.

REFERENCE NUMERALS

1 Mobile manipulator
2 Electrical connector
3 Tool holder assembly
5 Support
6 Tool (i.e. electrical probing tip)
7 Flexible cable
8 First flexible arm of the first part
9 Second flexible arm of the first part
10 First flexible arm of the first part
11 Second flexible arm of the second part
12 Extension on the first part
13 Extension on the second part
14 Slot on the first part
15 Slot on the second part
16 Projection on the first part
17 Projection on the first part 18 Projection on the second part
19 Projection on the second part
20 Piezoelectric ceramic
21 Ruby contact
22 Magnet
23 Piezoelectric actuator
30 First part
31 Second part
33 Curved surface
34 First side of the second part
36 Second side of the second part
37 First side of the first part
38 Second side of the first part
42 End of the extension on the first part
43 End on the extension on the second part
44 Receiving region of the first part
45 Receiving region of the second part
50 Mobile vehicle

The invention claimed is:

1. A tool holder assembly, suitable for use in a mobile manipulator, the tool holder assembly comprising,
a first part which is configured such that it is attachable to a mobile vehicle; and
a second part which is configured to cooperate with a tool to hold said tool;
wherein the first and second parts each comprise, a first flexible arm and a second flexible arm and a slot;
wherein the first and second parts are configured such that they can be arranged so that at least a portion of the first and second flexible arms of the each of the first and second parts may be simultaneously received into the one or more slots in the other part, to hold the first and second parts in mechanical cooperation;
wherein the slot in each of the first and second parts is defined by a through hole provided in the first and second parts.

2. A tool holder assembly according to claim 1 wherein said portions of the first and second flexible arms of the each of the first and second parts, are projections provided on the first and second flexible arms.

3. A tool holder assembly according to claim 2 wherein the first and second parts are configured such that when the projections on the first and second flexible arms of each part are received into the slot on the other part, the first and second flexible arms of each part are flexed, so that the first and second flexible arms of one part apply an elastic force to the other part.

4. A tool holder assembly according to claim 3 wherein the dimensions of said slots are smaller than the dimensions of said projections on the first and second flexible arms, so that only a part of each projection is received into each slot, so that the first and second flexible arms are flexed when projections on the first and second flexible arms of each part are received into slot on the other part, so that the first and second flexible arms of the first part apply an elastic force to the second part and the first and second flexible arms of the second part apply an elastic force to the first part.

5. A tool holder assembly according to claim 2 wherein the projections each comprise a curved surface.

6. A tool holder assembly according to claim 1 wherein each of the first and second parts further comprise a stopper configured to restrict the relative movement between first and second parts as the first and second parts are being arranged to cooperate.

7. A tool holder assembly according to claim 6, wherein each stopper comprises an extension which is interposed between the first and second flexible arms, wherein each extension is configured such that the extension on the first part abuts the extension on the second part, when the portion of the first and second flexible arms of the each of the first and second parts is simultaneously received into the one or more slots of the other part.

8. A tool holder assembly according to claim 1 wherein the first part comprises a connecting means for connecting the tool holder assembly to a mobile vehicle.

9. A tool holder assembly according to claim 1 wherein the second part further comprises a tool which is attached thereto.

10. A tool holder assembly according to claim 9 wherein the tool comprises at least one of, a force sensor, thermal/heat sensor, electrical probing tip, atomic force microscopy probe tip, micro/nano gripper, micro/nano tweezers, optical fiber, pipette, antenna, electrodes, micro-valve, liquid/gas injector, liquid dispenser, scanning tunnelling microscope tips, suction cup, cleaning system, scratching system, soldering system, screwdriver, scanner device, actuator, actuated subsystem with at least one degree of freedom, and/or sensor suitable for measuring physical parameters.

11. A tool holder assembly according to claim 1 wherein the tool holder assembly further comprises an electrical interface which can electrically connect the tool holder assembly to a mobile vehicle.

12. A mobile manipulator comprising, a mobile vehicle, and a tool holder assembly according to claim 1 which is attached to the mobile vehicle.

13. A tool holder assembly kit comprising,
a first part of a tool holder assembly which is configured such that it is attachable to a mobile vehicle; and
two or more second parts of the tool holder assembly, each of the two or more second parts comprising a different tool attached thereto;
wherein the first part and two or more second parts each comprise, a first flexible arm and a second flexible arm and a slot;
wherein the first and second parts are configured such that a first part and any one of the second parts can be arranged so that at least a portion of each of the first and second flexible arms of each of the first and second parts, may be simultaneously received into the slots of the other part, to hold the first and second parts in cooperation;
wherein the slot in each of the first and second parts is defined by a through hole provided in the first and second parts.

14. The tool holder assembly kit according to claim 13 wherein said portions of the first and second flexible arms of each of the first and second parts are projections provided on the first and second flexible arms of each part, and wherein the dimensions of the slots are smaller than the dimensions of the projections, so that only a part of each projection can be received into each slot, so that the first and second flexible arms are flexed when the projections on the first and second flexible arms of each part are received into the slot on the other part.

* * * * *